United States Patent [19]

Nicolaus

[11] 4,273,333

[45] Jun. 16, 1981

[54] GEAR TRAIN GOVERNORS IN SPINNING REEL GAMES

[75] Inventor: Frank G. Nicolaus, Chicago, Ill.

[73] Assignee: Bally Manufacturing Corporation, Chicago, Ill.

[21] Appl. No.: 16,099

[22] Filed: Feb. 28, 1979

[51] Int. Cl.[3] .......... A63F 5/04; F16D 41/06

[52] U.S. Cl. .......... 273/143 R; 188/270; 192/45

[58] Field of Search .......... 273/143 R, 143 A, 143 B, 273/143 C, 143 D, 143 E, 138 R, 138 A; 188/270, 291; 64/30 R, 30 C; 192/45; 74/3.5, 17.5

[56] References Cited

U.S. PATENT DOCUMENTS

| | | | |
|---|---|---|---|
| 197,899 | 12/1877 | Root | 188/270 X |
| 491,969 | 2/1893 | Lyon | 192/45 |
| 897,846 | 9/1908 | Olds | 192/45 |
| 1,677,647 | 7/1928 | Mills | 273/143 R X |
| 1,827,039 | 10/1931 | Ragan | 64/30 C |
| 1,985,406 | 12/1934 | Galkin | 192/45 X |
| 2,079,000 | 5/1937 | Brenner | 273/143 R X |
| 2,283,288 | 5/1942 | Rockola | 188/270 |
| 3,815,349 | 6/1974 | Gardella | 192/45 X |

FOREIGN PATENT DOCUMENTS

| | | | |
|---|---|---|---|
| 956912 | 8/1949 | France | 273/143 R |
| 42956 | 2/1908 | Switzerland | 188/270 |
| 840018 | 7/1960 | United Kingdom | 74/17.5 |

*Primary Examiner*—Richard C. Pinkham
*Assistant Examiner*—Arnold W. Kramer
*Attorney, Agent, or Firm*—Callard Livingston

[57] ABSTRACT

A mechanical governor and timer of the gear train type operative in combination with cyclically operating mechanisms, particularly game apparatus of the spinning reel type having a repetitious reversal pattern alternating in forward and reverse rotation phases in each duty cycle. Erratic timing and reel machine failure caused by localized gear and bearing wear produced in conventional timers due to the reversal pattern, is eliminated by a form of governor in which the input gear has as a part thereof an input spindle journalled in roller bearings operating in overriding clutch action in the gear hub and adapted for direct coupling with a countershaft component in the game apparatus to render the entire timing gear system unidirectional.

2 Claims, 5 Drawing Figures

Fig. 1-A

GEAR TRAIN GOVERNORS IN SPINNING REEL GAMES

The invention relates to improvements in mechanical timers and governors of the gear train type employing a series of gears operating in progressively torque-reducing ratios from an input gear which is usually coupled with a working shaft in a device, the speed of which is to be controlled at a desired slow rate for timing purposes, the last gear in the train having such a low output torque that any slight braking or loading force applied thereto is reflected back to the input gear in reversely magnified ratio (e.g. 750:1) effective to hold the controlled working shaft at the required speed.

Governors of the class described are commonly used with manually actuated devices and small spring-powered motors, the present disclosures relating particularly to use thereof to time the movements of certain shaft and countershaft elements in amusement and game apparatus of the spinning-reel type actuated in game or duty cycles by a manually pulled lever operated in one direction to rock certain main shaft and countershaft elements in an initial setting operation which will tension a power-spring drive mechanism thereafter triggered abruptly into action to drive such shaft elements reversely through a timed reel-spinning and indexing cycle, the handle lever being independently returned to its starting position, but during its initial advance being subject to severe restraint unless the loading of the timing gears is somehow relieved.

Owing to the usual connection between the timer and countershaft in the typical reel machine, it is mandatory to prevent the timer from resisting operation of the actuating handle and it has accordingly been the almost universal practice to employ the method disclosed in U.S. Pat. No. 2,579,241, FIG. 1, column 5, lines 36 ff. and column 6, lines 35 ff. for achieving this result by interposing a ratchet gear 105, as described therein, between an input gear 106 fast on the countershaft or "trigger shaft" 90 such that initial forward operation of the countershaft on pulling the actuating handle is not transmitted into the remaining timer gears 108, 109, so that the advance of the actuating hand lever is not impeded by the timer. While such a ratchet arrangement is effective in its purpose to liberate the actuating handle and has been in widespread use for nearly half a century, it is also discovered to be the source of malfunction including complete breakdown with potential to disable the reel machine as a whole by reason of invariant oscillation of the input gear, causing cumulative localized wear in its teeth and bearings with resultant erratic timing and ultimate jamming of the timer unit.

In accordance with the invention the game machine is freed from such timer malfunction under dependable regulation by the improved governor from which the ratchet gear is eliminated and a special input gear structure, unitized with the governor, operates unidirectionally from an input spindle in assembly therewith as a component of the governor unit and journalled in a set of bearing rollers working in free-wheeling or overriding clutch action within a hub forming part of this gear, such that the spindle will rotate with the reel machine countershaft only in the direction of the reversal phase thereof, in consequence of which the governor as a whole, to include every gear in the timing train and especially the input gear, is inactivated during the pull of the actuating hand lever.

More detailed aspects of the construction, operation, and utilitarian features of the disclosed improvements will appear as the following description proceeds in view of the annexed drawing in which:

FIG. 1 is a plan view of the improved governor mechanism in which the gear system is disposed in linear array, parts of the input gear being broken away and parts of the appertaining spindle and clutch structure being shown in section;

FIG. 1-A is a sectionalized diagram to enlarged scale illustrative of the overriding clutch action of the input spindle bearings;

Figure 3:
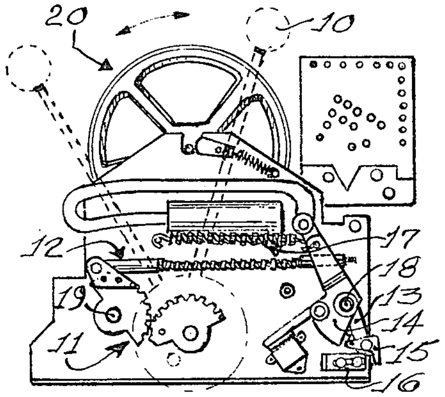
FIGS. 3 and 4 are elevational views of opposite sides of a type of spinning reel game mechanism having main actuating shaft and countershaft elements regulated by the improved governor.
Figure 4:
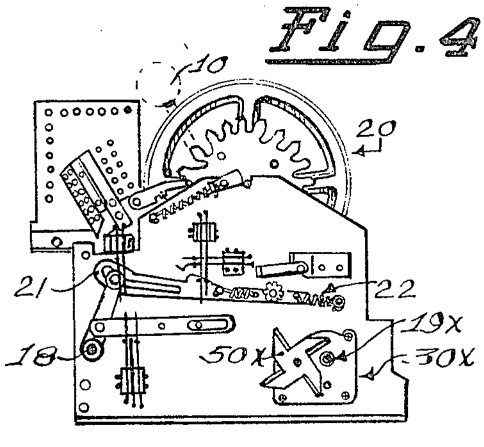
Figure 4:
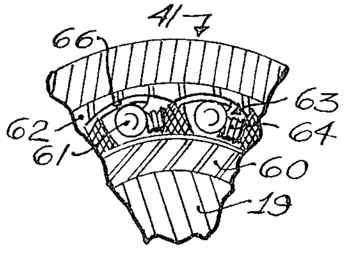

FIGS. 3 and 4 depict opposite sides of a reel machine similar to that shown in the mentioned U.S. Pat. No. 2,579,241, and also substantially identical to the form of reel mechanism depicted in U.S. Pat. No. 3,975,963, except for incorporation therein of the improved governor in accordance with FIG. 4.

Referring to the operation of a conventional type of reel mechanism such as shown in FIG. 3, a game cycle will be initiated by pulling the handle 10, which will actuate segment gears 11 and a thrust rod 12 to rock a drive lever 13 clockwise, such lever floating on the main shaft 18 and its initial forward motion being transmitted through the agency of a coupling trip dog 15 to a coaxial trip lever 14, fast on the main shaft and therefore turns such shaft because the trip dog 15 is pivotably mounted on said drive lever. When the handle reaches its stroke limit, the dog 15 engages a tripping cleat 16 and pivots abruptly to decouple the two levers thereby permitting the trip lever to reverse and fly back to starting position while simultaneously freeing the drive lever 13 for reversal to start its timed working stroke under urgence of power spring 17, which action imparts joint movement in the reverse direction to both the main shaft 18 and its counter shaft 19 for the purpose of spinning the set of reels 20 and thereafter indexing the reels to stop one at a time in various display positions in the manner well-known in the art.

On the opposite side of such reel machine as seen in FIG. 4, the main shaft 18 is linked to a reciprocable timing bar 21 which activates in both of its directions of travel a number of switches and other control instrumentalities governing various game cycle functions, the initial setting movement of this bar being toward the left responsive to the handle pull, the critical return travel of the timing bar 21 being effeted thereafter by spring means 22 back toward the right when the reverse working stroke of the trip lever is triggered as aforesaid in reversal of the main shaft.

It is essential that the stated return travel of the timing bar 21 in each game cycle shall proceed at a uniform slow rate to actuate the various control instrumentalities in timed relation with the three basic functions of the reel-activating mechanism, namely, setting the reels in motion, indexing each reel one after another at timed intervals into stopped display position; and signalling the completion of the cycle, all such functions requiring dependable and consistant performance on the part of whatever kind of governor means is employed. In the view of FIG. 4, a compacted form of the improved governor 30X, such as depicted to large scale in FIG. 2, is installed for coaction with the machine countershaft 19 to regulate the reel machine functions as above described.

Figure 2:
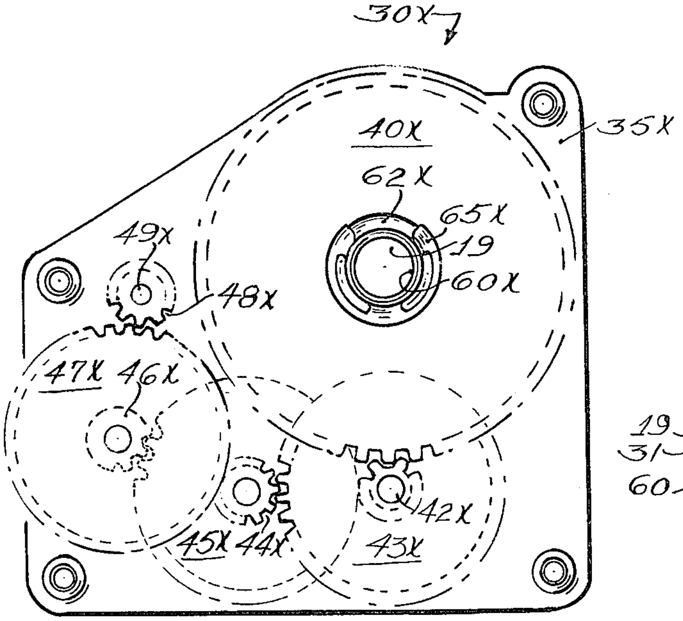
FIG. 2 is an internal view of a form of the governor embodying the identical gear system and clutch structure of FIG. 1 rearranged with the gears disposed in a compacted cluster array, one chassis plate being removed along with the appertaining loading fan to expose the gear array in elevation.
Figure 1:
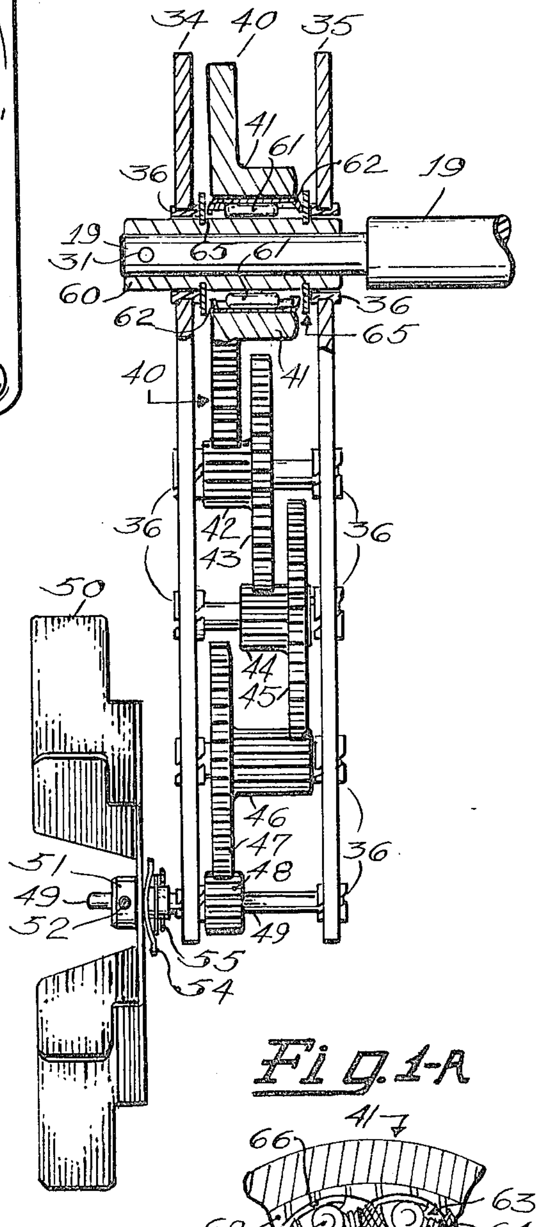

The construction and operation of the governor 30X, as adapted for combination with the form of reel game shown in FIGS. 2 and 4, is in operation and all essential components identical to that shown in detail in FIG. 1, in accordance with which the gear system is arranged in linear array journalled between a pair of chassis plates 34, 35 into which are set the appropriate number of synthetic insert bearings 36, such system comprising a large input gear 40 of the special construction to be described, and a train of intermediate gears and their appertaining pinions designated 42–43; 44–45; and 46–47, the latter driving a final output pinion 48 the spindle 49 of which projects through the outer chassis plate 34 to engage with a loading fan 50 (the corresponding plate and fan 50X being omitted in FIG. 2).

The loading fan 50 floats on a hub 51 fixed on the output spindle 49 by set screw 52, but normally rotates with the fan hub owing to the action of friction clutch means which may take the form of a spring presser washer 54 captured on the hub by cotter pin or like means 55 to exert sufficient drag on the fan to carry it around with the hub as aforesaid unless some extraneous agent, such as a probe, blocks its free movement, as in fraudulent attempts to interfere with the timing cycle, in which case the fan can remain stationary while the loading spindle and remainder of the gear train continues to run through the required duty cycle in defeat of the attempted interruption.

The directionally-selective action of the improved governor means is the result of the unitized construction of its input gear 40 detailed in FIG. 1 wherein it is seen to include a short input spindle 60 captured by snap rings 65 in assembly therewith in an enlarged hub portion 41 of the gear and journalled in a set of bearing rollers 61 retained in a cup-shaped cage 62 fitted in an enlarged hub portion 41 integrally conformed with this gear.

As illustrated to magnified scale in the sectional diagram of FIG. 1–A, each bearing roller is arranged in an appertaining chamber portion 63 of the cage to shift in a direction circumferentially of the spindle in the manner of overriding and free-wheeling ball clutches, each roller chamber including a circumferentially pitched ramp portion 66 narrowed radially of the spindle at one end and widening at the opposite end into an idling or freewheeling zone in which there is no clutching action, each roller being also urged normally by an appertaining bias spring 64 toward the narrower jamming end of its ramp into which it is instantly urged responsive to reversal rotation of the countershaft 19 to which the input spindle 60 is coupled, in consequence of which the input gear is seized for joint rotation with its spindle 60, and the gear train is then driven in its loading and regulating function.

Since the form of construction of the governor depicted in FIG. 2 embodies the identical gear and clutch means described in view of FIG. 1, like components in FIG. 1 are designated in FIG. 2 by like reference characters to which are added the suffix—X—, the construction of FIG. 2 differing from that of FIG. 1, as mentioned, solely in the respect that the intermediate and output gears are rearranged in less space between a smaller pair of chassis plates 34X, 35X in compact cluster fashion radially of the input gear, instead of in the more expansive linear array seen in FIG. 1, in order to provide a configuration more readily fitting certain existing forms of reel machine such as that shown in FIGS. 3 and 4, in substitution for the long-used prior form of timer in the type described in U.S. Pat. No. 2,579,241.

The effectiveness of the disclosed improvements is such that, while the prior form of timer equipped with intermediate ratchet gear means can be expected to be the source of erratic timing and other operational troubles with potential for complete machine failure in about 350,000 duty cycles, the presently disclosed governor structure, after well over a million cycles, shows no evidence in any gear of any significant wear other than that of uniform nominal usage perceptable under magnification, the performance of the reel machines incorporating this governor being entirely free of operational troubles, downtime, and failures attributable to timer malfunction, with indications that the life expectancy of the disclosed governor when subjected to the damaging repetitious reverse cycling peculiar to the reel game combination, is greater than the overall life expectancy of the reel mechanism itself.

I claim:

1. In cyclically operable game apparatus of the type wherein a drive shaft is oscillated in each game cycle in a forward setting phase initially with reversal in a return stroke phase in which the speed thereof is regulated by governor means of the fan-loaded gear-train type, improvements in governor means characterized in that: the governor comprises a gear array including a large diameter input gear coupling with said drive shaft, and a small low-torque output gear driving a loading fan, together with a train of intermediate reduction gears drivingly interconnecting the input and output gears, said input gear being drivingly coupled with said drive shaft through a unidirectional clutch of the precision ball type operative to drive the input gear only in the direction of rotation of the drive shaft in the return phase thereof, such that the respective gears in the entire array are constrained always to turn in the same unidirectional progression through cumulatively complete revolutions, and no gear can be repetitiously oscillated in any game cycle operation of said drive shaft, whereby all of the teeth of all of the gears in the array will be exposed to wear stress notwithstanding repetitious oscillation of the drive shaft in repetitious cycling of said game apparatus.

2. Apparatus according to claim 1 further characterized in that said governor comprises a unitary assembly including a pair of parallel chassis plates between which the gears of said gear array are journalled, and said input gear includes an axially extending bore in which said clutch is set, said clutch including a coaxial bore in which is set an axially extending input stub-shaft having communication through at least one of said plates for joinder in driving engagement with the drive shaft as aforesaid.

* * * * *

UNITED STATES PATENT AND TRADEMARK OFFICE

CERTIFICATE OF CORRECTION

PATENT NO. : 4,273,333

DATED : June 16, 1981

INVENTOR(S) : Frank G. Nicolaus

It is certified that error appears in the above-identified patent and that said Letters Patent is hereby corrected as shown below:

Column 1, line 63, change "spindle" to --input gear--.

Signed and Sealed this

*Thirteenth* Day of *August 1985*

[SEAL]

*Attest:*

DONALD J. QUIGG

*Attesting Officer* *Acting Commissioner of Patents and Trademarks*